(12) United States Patent
Selejan (10) Patent No.: US 8,045,307 B2
(45) Date of Patent: Oct. 25, 2011

(54) FAULTED PHASE DECISION METHOD BETWEEN CURRENT AND VOLTAGE BASED DELTA PHASE SELECTORS

(75) Inventor: Florin Peter Selejan, Wescosville, PA (US)

(73) Assignee: ABB Technology AG, Zurich (CH)

( * ) Notice: Subject to any disclaimer, the term of this patent is extended or adjusted under 35 U.S.C. 154(b) by 423 days.

(21) Appl. No.: 12/444,428

(22) PCT Filed: Oct. 12, 2007

(86) PCT No.: PCT/US2007/021855
§ 371 (c)(1), (2), (4) Date: Apr. 6, 2009

(87) PCT Pub. No.: WO2009/008871
PCT Pub. Date: Jan. 15, 2009

(65) Prior Publication Data
US 2010/0053829 A1 Mar. 4, 2010

Related U.S. Application Data

(60) Provisional application No. 60/851,617, filed on Oct. 13, 2006.

(51) Int. Cl.
*H02H 3/00* (2006.01)
(52) U.S. Cl. .......................................................... 361/80
(58) Field of Classification Search .................... 361/79, 361/80
See application file for complete search history.

(56) References Cited

U.S. PATENT DOCUMENTS

| | | | | |
|---|---|---|---|---|
| 3,731,152 A | * | 5/1973 | Rockefeller, Jr. | 361/80 |
| 3,984,737 A | * | 10/1976 | Okamura et al. | 361/80 |
| 4,344,143 A | * | 8/1982 | Kurosawa et al. | 700/293 |
| 4,357,666 A | * | 11/1982 | Matsushima et al. | 700/293 |
| 4,409,636 A | * | 10/1983 | Brandt et al. | 361/87 |
| 4,507,700 A | * | 3/1985 | Andow et al. | 361/80 |
| 4,689,710 A | | 8/1987 | Anzai | |
| 4,812,995 A | * | 3/1989 | Girgis et al. | 700/292 |
| 5,170,308 A | * | 12/1992 | Inagaki et al. | 361/36 |
| 5,883,578 A | * | 3/1999 | Roberts et al. | 340/661 |
| 7,050,913 B2 | * | 5/2006 | Cox | 702/60 |

FOREIGN PATENT DOCUMENTS
WO PCT/US2007/021855 10/2007
* cited by examiner

*Primary Examiner* — Rexford Barnie
*Assistant Examiner* — Christopher Clark
(74) *Attorney, Agent, or Firm* — Michael C. Prewitt; Melissa J. Szczepanik (57) ABSTRACT

A method of identifying fault conditions in a three phase power system includes monitoring the changes of both the current and voltage properties on a three phase power network. A maximum phase change value of both the current and voltage is determined. Either the voltage or the current values are selected, whichever includes the largest maximum phase change. Thereafter, the selected set of measurements is analyzed to determine whether a fault condition exists on any phase of the three phase power.

14 Claims, 6 Drawing Sheets

FAULTED PHASE DECISION METHOD BETWEEN CURRENT AND VOLTAGE BASED DELTA PHASE SELECTORS

CROSS-REFERENCE TO RELATED APPLICATION

This application claims priority from PCT Application No. US2007/021855, filed on Oct. 12, 2007, which claims priority to U.S. Provisional Application No. 60/851,617 filed on Oct. 13, 2006, each of which are hereby incorporated by reference in their entirety.

BACKGROUND

Protective relays are employed to monitor whether fault conditions exist in multiphase electrical lines and to then electrically isolate faulted phases. Some protective relays utilize delta phase selectors to detect the faulted phases in power circuits. Whether the implementation is achieved with analog components or digitized for numerical relay, the process starts by passing the phase voltages or currents through a filter that removes the nominal frequency component of the power system. Under normal conditions, when there is no disturbance or fault event, the output of the change detect filter will be zero. When a fault in the power circuit occurs, a change in the current or voltage waveform will occur and the change detect filter will have a non-zero output. The magnitude of the change is indicative of the significance of the actual change in the power circuit as represented by the voltage and/or current values.

An example of a protective relay that utilizes a delta phase selector includes U.S. Pat. No. 4,409,636 (hereinafter "the '636 patent") to Brandt et al. which is hereby incorporated by reference. Though these prior art methods have proven effective, not as accurate in their determination of the faulted phase(s), and therefore better accuracy is desirable.

SUMMARY OF THE INVENTION

In general, a protective relay according to the present invention provides protective control to a power system carrying three-phase power. The protective relay includes a processor, at least one computer readable medium, program instructions stored on the computer readable medium and executable by the processor to perform fault detection monitoring. The monitoring may include the steps of receiving a first set of signal values representative of the voltage properties of the power carried by each phase of the three-phase power system and a second set of signal values representative of the current properties of the power carried by each phase of the three-phase power system, processing the first set of signal values to produce a first set of processed signals representing the current change for each respective phase of the three phase power, processing the second set of signal values to produce a second set of processed signals representing the voltage change for each respective phase of the three phase power, determining a maximum value of the first set of processed signals and a maximum value of the second set of processed signals, selecting the set of processed signals having the larger maximum value, and using the selected set of processed signals to determine whether a fault condition exists on any phase of the three phase power.

According to another aspect of the present invention, the a method of determining fault conditions in a three phase power system includes receiving a first set of signal values representative of the voltage properties of the power carried by the three-phase power system and a second set of signal values representative of the current properties of the power carried by the three-phase power system, processing said first set of signal values to produce a first set of processed signals representing the current change for each respective phase of the three phase power, processing the second set of signal values to produce a second set of processed signals representing the voltage change for each respective phase of the three phase power, determining a maximum value of the first set of processed signals and a maximum value of the second set of processed signals, selecting the set of processed signals having the larger maximum value, and using the selected set of processed signals to determine whether a fault condition exists on any phase of the three phase power.

DETAILED DESCRIPTION

Figure 1:
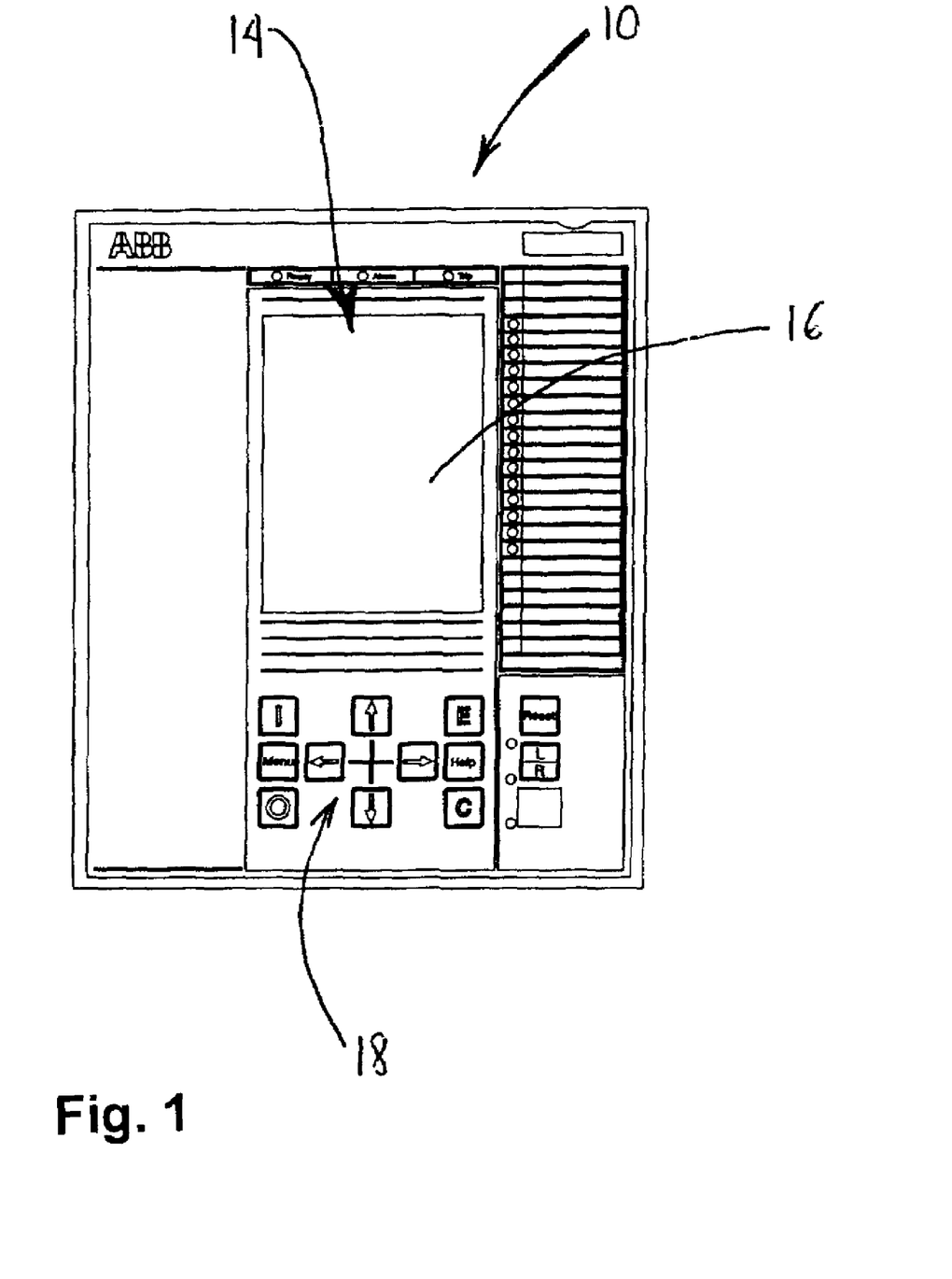
FIG. 1 is a front view of a protective relay embodied in accordance with the present invention.
Figure 2:
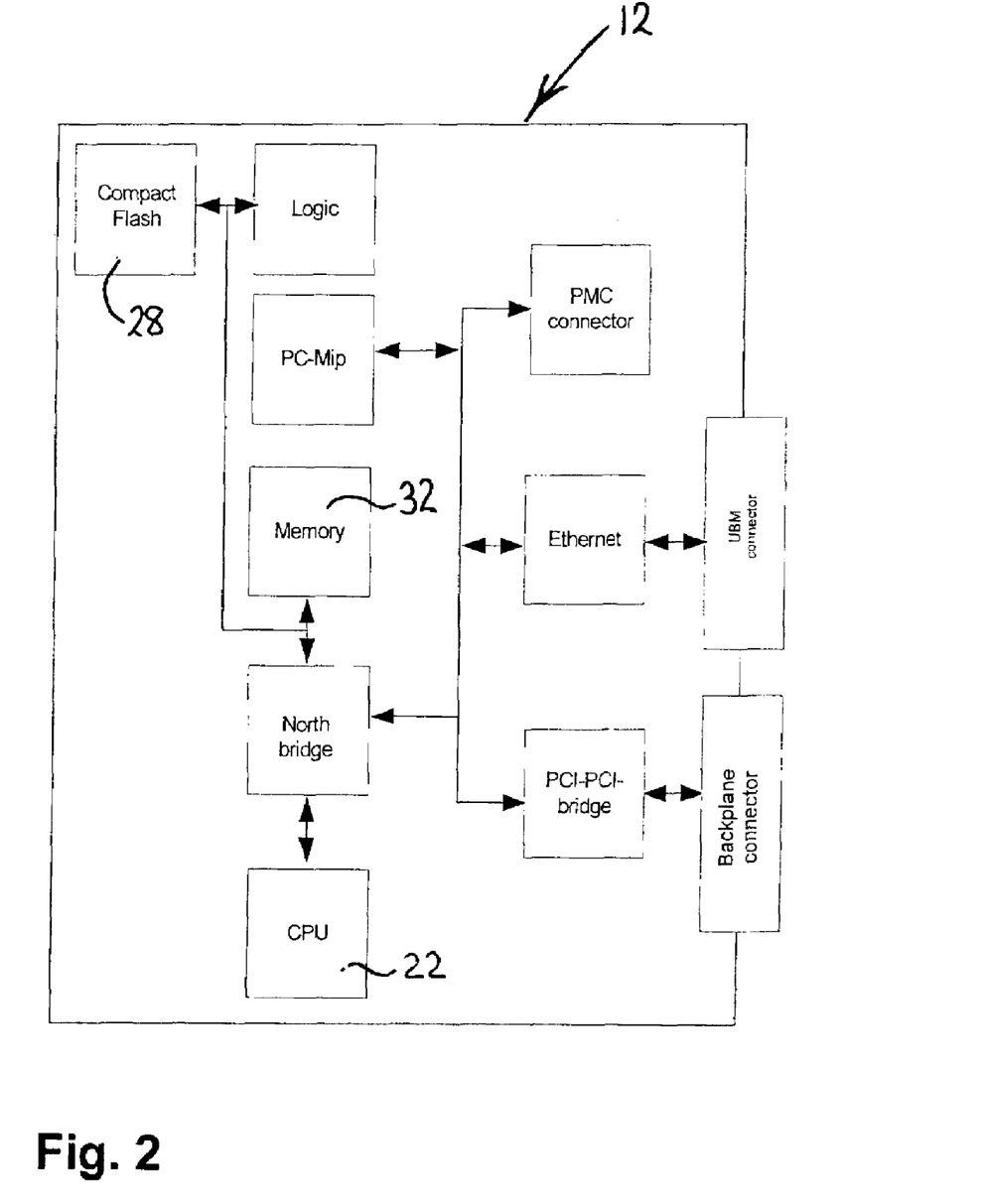
FIG. 2 is a schematic view of a numerical module of the protective relay.

With reference now to FIGS. 1 and 2, the present invention is directed to a protective relay 10 for detecting the faulted phase(s) in a power circuit and correspondingly tripping circuit breakers when operating in conjunction with the protective functions in the relay. Protective relay 10 may be a directional protective relay, a differential protective relay, or a distance protective relay. The protective relay 10 may have a modular construction and include a power supply module, a combined backplane module, a transformer input module, an analog-to-digital (A/D) conversion module, a universal backplane module and a numerical module 12 (shown schematically in FIG. 2), all of which are interconnected by a backplane. The protective relay 10 may also include a human machine interface (HMI) 14 (shown in FIG. 1) having a display screen 16 and a plurality of input keys 18 through which information may be input to the protective relay 10. The combined backplane module carries all internal signals between the modules in the protective relay 10. Transformer input modules may receive and transform voltage and current signals from voltage and current sensors connected to the protected power circuit and galvanically separates these signals from the rest of the circuitry of the protective relay 10. The universal backplane module forms part of the backplane and connects the transformer input module to the A/D conversion module. The universal backplane module is also connected to the numerical module 12. Analog signals from the current and voltage sensors may be converted to digital signals by A/D converters in the A/D conversion module.

Referring now to FIG. 2, the numerical module 12 includes a central processing unit (CPU) 22, flash memory 28 and dynamic random access memory (DRAM) 32. Software control logic 40 (see FIG. 6) may be stored in the flash memory using a flash file system. During power up of the protective relay 10, the control logic 40 is transferred to the DRAM 32.

The CPU 22 accesses the control logic 40 in the DRAM 32 and executes it. The control logic 40 generally includes three logic sub-portions (shown in FIG. 6). A delta filter portion 48, fault phase portion 50 and quality portion 52.

The control logic 40 may be written in a graphical programming language utilizing function blocks. A function block performs a specific function and typically has at least one input variable, at least one output variable, one or more internal variables and an internal behavior description. A function block may also have a through variable. The internal behavior can be driven by continuous or discrete time, or can be event driven. A function block operates in conjunction with other function blocks (via communications called links) to implement a control strategy or scheme. A function block typically performs one of an input function (such as that associated with a transmitter, a sensor or other variable measurement device), a logic or variable manipulation function (such as adding, subtracting, multiplying, etc.), or an output function which performs a control or indication function. In the description below, the control logic 40 is described in terms of being written in a graphical programming language using function blocks, which are simply referred to as "blocks".

Figure 4:
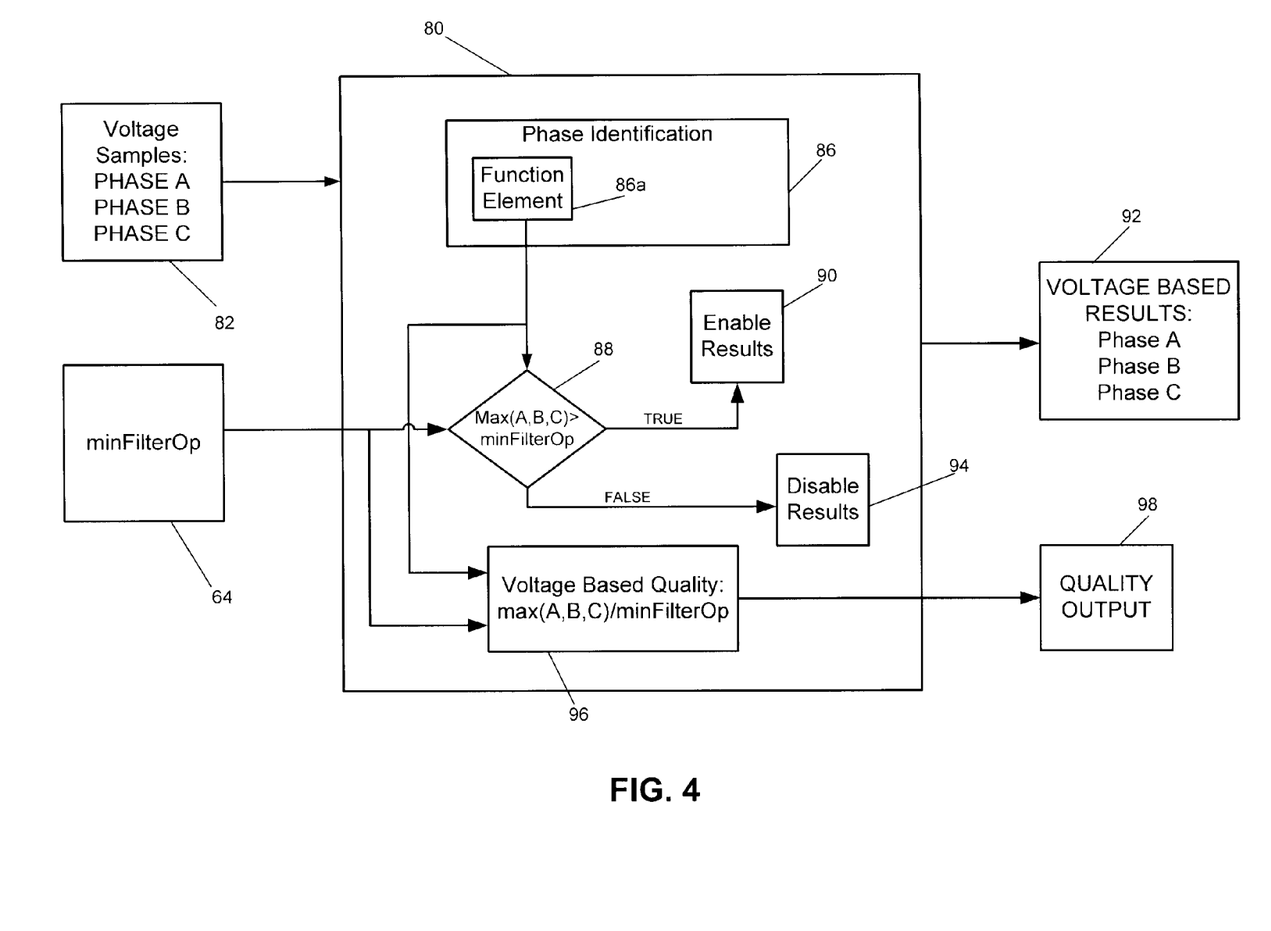
FIG. 4 shows the calculation of a voltage based quality value in accordance with the present invention.
Figure 5:
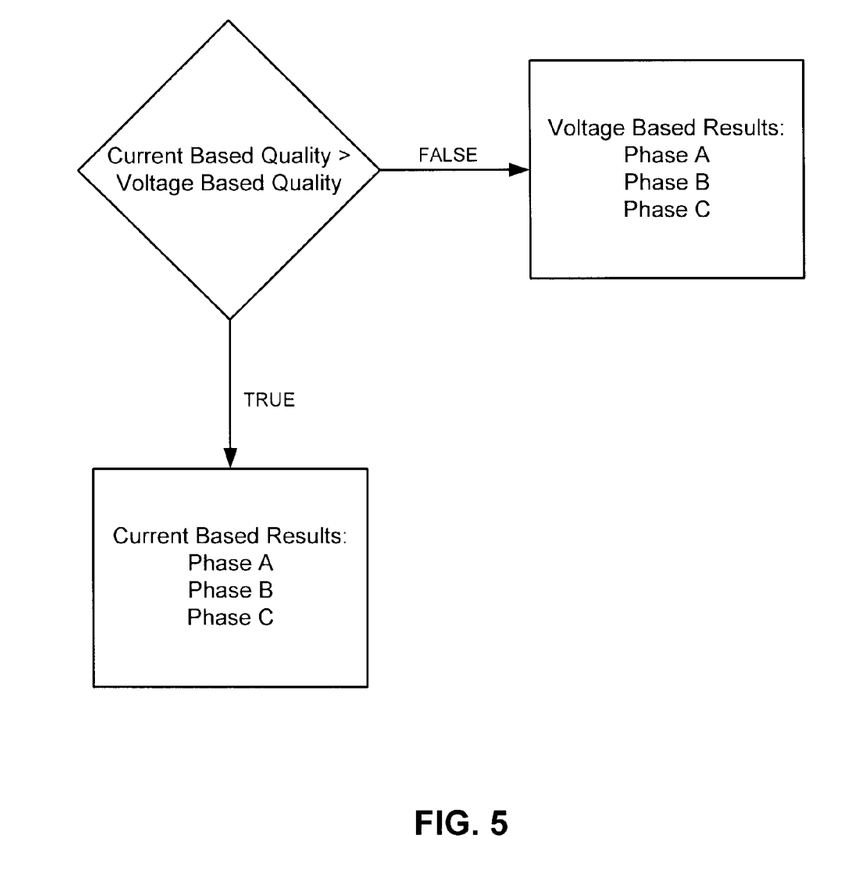
FIG. 5 shows the output selection based on the larger of the current based quality value or the voltage based quality value.

As will be described below in greater detail, the delta based phase selector of the present invention detects the faulted phases by detecting the changes in current (FIG. 3 and voltage (FIG. 4) and then selecting one of those detected changes to detect the faulted phase (FIG. 5). Depending on line conditions (strong vs. weak source) and fault location (close-in vs. far-out) in most cases both current and voltage based results are produced. The current based results are more often the most correct result, as voltages are more prone to induced harmonics during a fault, causing erroneous results. However, even when both currents and voltages produce results, for certain faults, the voltages will sometimes produce the correct results.

A fault can be equated to a load drawing a certain amount of power (P=V*I), and typically one that is beyond the operational envelope of the device that is being protected, namely, the transmission line. Within normal load conditions, the rest of the system (due to the physical characteristics of generators, transformers, etc.) dictate that the voltages stay at a constant level, for example, 69 kV, 230 kV, 500 kV, etc. It is current that changes to match the demand exerted by the load/fault. Currents will therefore be more responsive than voltages to the load/fault. The situation becomes exacerbated by the fact that an increased load actually causes a dip in the voltage levels, possibly all the way to 0V. While faults can occur anywhere on the line, the sensors are stationary. Thus current does not always give the best indication of fault. Depending on system conditions such as the SIR (source to impedance ration), and fault location, the voltages can sometimes produce a better indication of the fault than the currents. It is therefore advantageous to distinguish between the voltage and current based results to determine which best shows a fault.

Figure 3:
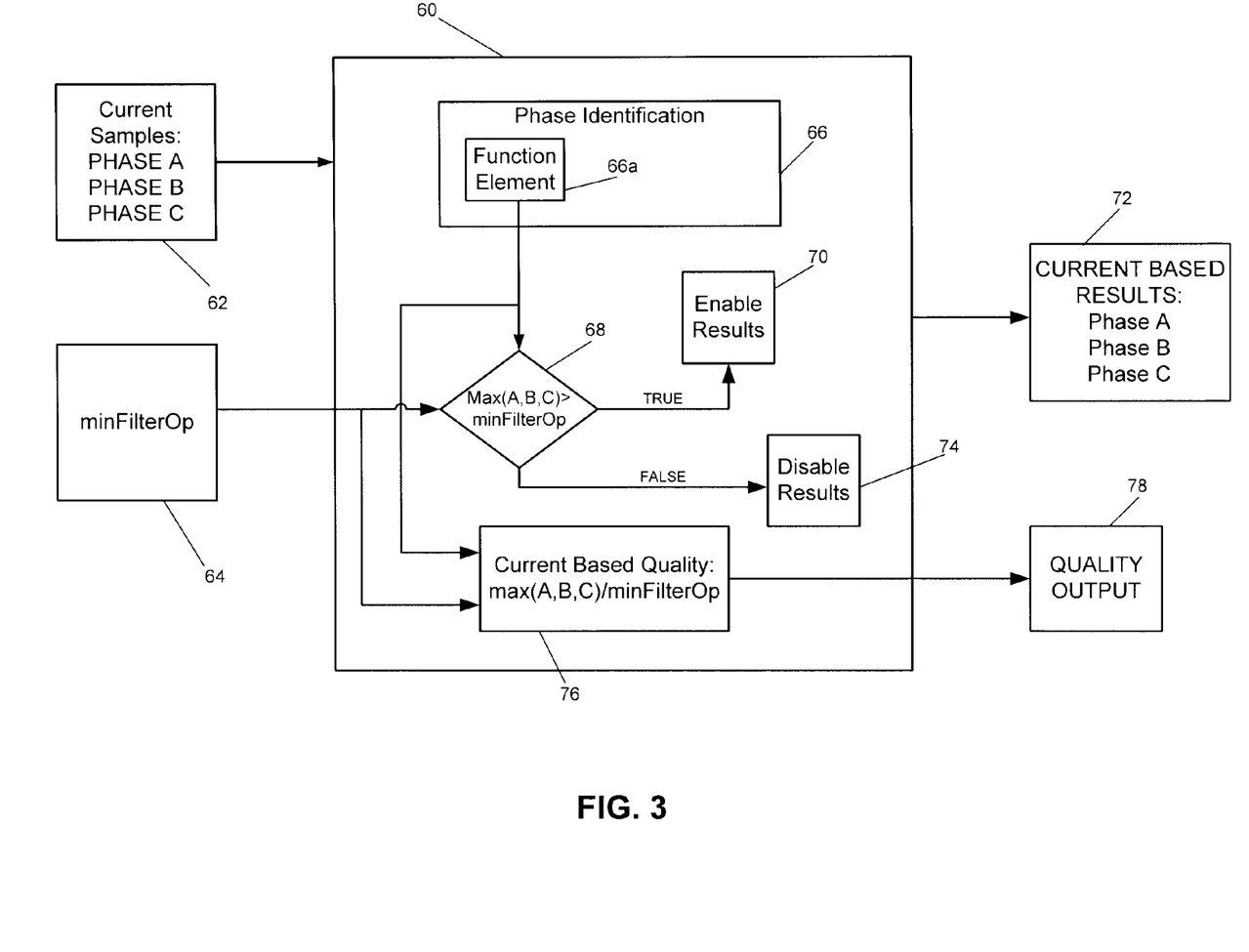
FIG. 3 shows the calculation of a current based quality value in accordance with the present invention.

Referring now to FIG. 3, there is shown an overview of a current based quality calculation in accordance with the present invention. A delta phase selector 60 has as an input the current samples 62 from phases A, B, and C of a protected circuit and an input signal 64 labeled current minFilterOp, the function of which will be described in greater detail below. At block 66 the largest current change of either phase A, B or C is identified and output at 66a. In one or more embodiments, the largest current change may be determined based on a delta filter method as described in the '636 patent.

The minFilterOp signal 64 and the output of block 66a are provided as inputs to decision block 68. Decision block 68 determines if the maximum current change from block 66a is greater than the value of minFilterOp 64. MinFilterOp 64 represents the least amount of change needed to produce an output from the delta phase selector and thus acts as a threshold value. In one embodiment, the minFilterOp signal value is expressed as a percentage of the rated system current.

The value of the minFilterOp signal 64 is determined by the user of the present invention and can be set by the user to be one of the values in a predetermined range of values. The predetermined range of values may be based on the present invention giving valid results for fault detection and allows the user to select a value suited to the particular power system. The value should advantageously be slightly larger than the largest sudden power swing expected to be seen in the current phases. Typically such values may be 1% to 3% of the rated current.

As is shown in FIG. 3, if the value of the maximum change of the current amplitude in either phase A, B, or C is greater than the value of the minFilterOp signal 64 then at block 70 the delta phase selector 60 selects the current based results at output 72. If the value of the maximum change is less than the value of the minFilterOp signal 64 then at block 74 the delta phase selector 60 disables the selection of the current based results and results do not appear at output 72. Collectively, the current based results include the current change values of all three phases.

In accordance with the present invention, delta phase selector 60 further includes a block 76 that receives the output of block 66a as well as the minFilterOp signal 64. Block 76 determines the ratio of the maximum change detected of the current in any of the three phases to the amplitude selected for the minFilterOp signal 64. The output 78 of block 76 is called the current based quality 78, which represents how many times larger the maximum change of the current is over the minFilterOp setting. The value for quality can, depending on the type of processor used, be either an integer value, that is 1, 2, 3 etc, or a non-integer value, for example 1.27.

Referring now to FIG. 4, there is shown an overview of a voltage based quality calculation in accordance with the present invention. The delta phase selector 80 has as its input the voltage samples 82 from protected phases A, B, and C and a voltage minFilterOp signal 64. Blocks 86, 88, 90, 94 and 96 of delta phase selector 80 perform the same function on voltage samples 82 as blocks 66, 68, 70, 74 and 76, respectively of delta phase selector 60 performed for current samples 62.

The delta phase selector 80 has as its output 92 the voltage based results if the maximum change of the voltage amplitude in either phase A, B, or C is greater than the associated value of the minFilterOp signal 64 as determined by decision block 88. A corresponding quality 98 is also output. The value of the minFilterOp signal 64 for voltage should be slightly larger than the largest sudden power swing expected to be seen in the voltage phases. Typically the value can be between 1% and 3% of the rated voltage. It should be appreciated that, in one embodiment, the minFilterOp signal for the voltage based calculations may be the same as that used for the current based calculations. In other embodiments, the minFilterOp signal for the voltage based calculations may be set to a different value than the minFilterOp signal for the current based calculations.

The quality output 78 of selector 60 and quality output 98 of selector 80 correspond to the amount of impact the fault has in the currents or voltages respectively. The present invention uses, as is shown in FIG. 5, the current based quality output 78 and the voltage based quality output 98 to determine if the current based results or the voltage based results should be used to correctly determine the identity of the faulted phase or phases. If, as is shown in FIG. 5, the current based quality is greater in value than the voltage based quality, the present invention selects the current based results. If the reverse is true, then the present invention selects the voltage based results.

The current based phase selector calculation may produce different results than the voltage based phase selector calculation. The comparison between current based quality and voltage based quality is the determining factor that enables the a more accurate identification of the faulted phase or phases, and often the phase where the fault is first detected. This is because the strongest effect of the fault is captured and quantified in the "quality" variable and used to select either the current or voltage based results. The present invention is faster and provides better discrimination than prior art methods of faulted phase selection.

Figure 6:
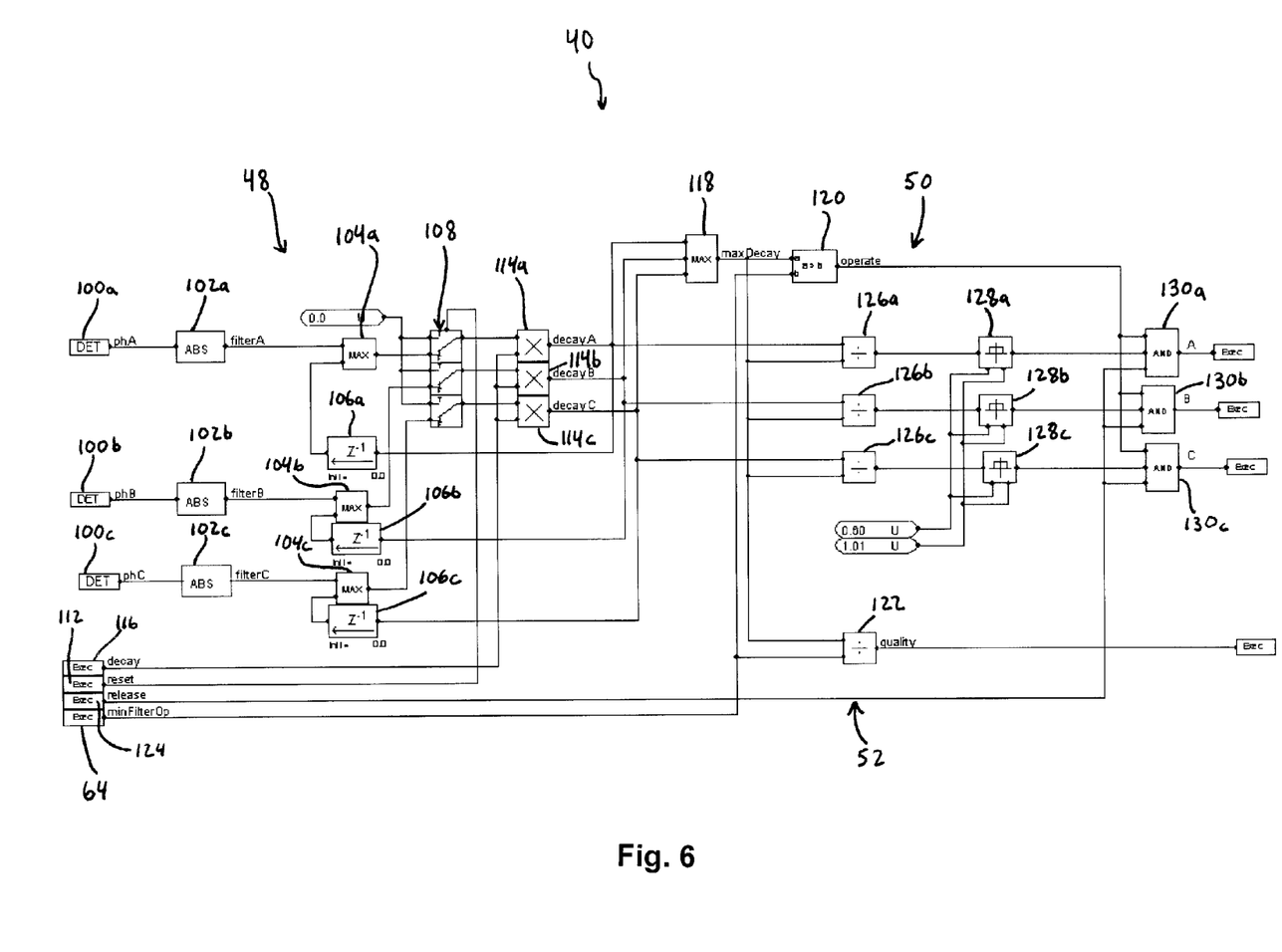
FIG. 6 shows the logic diagram with the function blocks that implement the calculations shown in FIGS. 3 and 4 and the output selection of FIG. 5.

Referring now to FIG. 6, there is shown a logic diagram with function blocks that implement the calculations shown in FIGS. 3-5. Generally, sections 48 and 50 represent portions of delta phase selectors 60 or 80 that determine whether the current based results or voltage based results appear at the output of the associated selector. Section 52 is the portion of the delta phase selectors 28 or 46 that calculates either the current based quality or voltage based quality.

The delta phase selector is connected to a power network having three phases A, B and C. In the case of delta phase selector 60, a signal representative of current is acquired through the use of, for example, a current transformer. In the case of delta phase selector 80 a signal representative of voltage is acquired through the use of, for example, a voltage transformer. The voltage signals representative of the current or voltage may be directed to an A/D conversion module and converted to digital signals, which are provided to the control logic running in the CPU 22. In the control logic 40, each digitized voltage signal (representing the current or voltage of a phase) is fed to a detector block 100 that includes a band exclusion filter and an amplifier. The band exclusion filter removes the component of the signal having the same frequency as the nominal operating frequency of the power network. The filtered signal is amplified and then supplied to an absolute value block 102, which determines an absolute value of the amplified signal. Under normal conditions (i.e., no faults in the power network), this absolute value signal is zero or approximately zero, due to noise in the power network 60 as well as measurement and filtering imperfections. When a change (e.g. a fault) occurs in the power network 60, the absolute value signal will spike. If the change persists, the absolute value signal will drop back to zero or around zero. Therefore, a typical fault will be detected twice: first at its inception, and then when the fault clears, either by itself or when a breaker opens.

For each phase, a first input of a maximum block 104 is connected to an output of the absolute value block 102 and a second input of the maximum block 104 is connected to an output of a memory block 106. The maximum block 104 is operable to output the greater of its first and second inputs. The outputs of the maximum blocks 104 for the three phases A, B, C are connected to false inputs of a switch 108. A zero value block 110 is connected to true inputs of switch 108. A reset signal 112 is provided to a control input of the switch 108. The control input (and therefore the reset signal 112) controls the operation of the switch 108. When the reset signal 112 is true (a Boolean one), outputs of the switch 108 are set to the true inputs (i.e. zero), whereas when the reset signal is false (a Boolean zero), the outputs of the switch 108 are set to the false inputs, i.e., the outputs of the maximum blocks 104a, 104b, 104c. The outputs of the switch 108 are connected to first inputs of multiplier blocks 114a, b, and c, respectively. Second inputs of the multiplier blocks 114a, b, and c are connected to a decay signal 116, which may be set and modified by a user through, for example, the HMI 14. The decay signal 116 has a value in a range of from about 0.5 to about 0.99. Thus, the output signals from the switch 108 are reduced by a percentage in a range of from about 50% to about 1%. These reduced output signals are hereinafter referred to as the phase decay signals.

The phase decay signals are input to the memory blocks 106a, 106b, 106c, respectively. In each phase, the memory block 106 delays the decay signal by one execution cycle. The memory block 106 ensures that any transient spike in the absolute value signal from the absolute value block 102 is captured. When the reset signal 112 is true, the reset signal 112 resets the memory blocks 106a, 106b, 106c, respectively. The reset signal 106 may be momentarily set to a Boolean one by a user.

In addition to being input to the memory blocks 106a, b, and c in the first logic portion 48, the phase decay signals are transmitted to the second logic portion 50. At second logic portion a maximum block 118 receives is connected to the output of multiplier blocks 114a, 114b and 114c and determines the maximum phase decay signal. Operate block 120 includes a first input that receives the maximum phase decay signal and a second input that receives the minFilterOp signal 64. If the maximum phase decay signal is greater than the minFilterOp signal 64, comparator block 120 outputs a true (boolean one "operate") signal.

The maximum phase decay signal from block 118 is also input to a quality block 122 along with the minFilterOp signal. Division block 122 divides the maximum phase decay signal by the minFilterOp signal to output the quality value. The quality value of delta phase selectors 60 (current based) and 80 (voltage based) are compared (shown in FIG. 5) and the greater of the two will output the corresponding values. In one embodiment, the current based and voltage based quality values are compared and the greater of the two will output a true release signal 124 in the corresponding control logic while the lesser of the two will output a false release signal 124. As will be hereinafter described, in this manner only the results from one of the delta phase selectors will be output, ie. that selector with the greater quality value.

In order to determine which phase or phases are in fault, divider blocks 126a, 126b and 126c each receive the phase decay signals from multiplier blocks 114a, 114b and 114c respectively. The respective decay signals are divided by the maximum phase decay signal output from block 118. The output of blocks 126a, 126b and 126c are then transmitted to range blocks 128a, 128b and 128c respectively. Range blocks 128 are adapted to output a true value when the incoming signal is within a preset range. In the present embodiment, a true signal is output if the signal from blocks 126 are between 0.60 and 1.01 (ie. 60% to 100%).

Finally, fault blocks 130a, 130b, and 130c each receive as an input the signal from the operate block 120, the release signal 124, and the respective signal from range blocks 128a, 128b and 128c. For each phase, the output of range block 128 is true, the output of the operate block 120 is true, and if the release signal 124 is true, then block 130 will output a true signal which represents a fault on the respective phase.

A true signal from block 130a, 130b or 130c represents a fault on phase A, phase B or phase C respectively. Thus the outputs of blocks 130a, 130b and 130c may be connected to circuit breakers for phases A, B and C respectively. According to one embodiment, a Boolean one at the output of block 130a will trip the circuit breaker for phase A, a Boolean one at output of block 130b will trip the circuit breaker for phase B and a Boolean one at the output of block 130c will trip the circuit breaker for phase C. According to this or other embodiments, a Boolean one at the output of block 130a will trip an alarm signal or indicator for phase A, a Boolean one at output of block 130b will trip an alarm signal or indicator for phase B and a Boolean one at the output of block 130c will trip an alarm signal or indicator for phase C.

It should further be appreciated that the present invention may be used in conjunction with other fault detecting mechanisms. For example, the present invention may be included in a protective relay wherein a separate mechanism initially detects a fault condition on the three phase power. The present invention may be used in conjunction with the fault detector to accurately determine specifically which phase or phases are in fault or which phase faulted first.

It is to be understood that the description of the foregoing exemplary embodiment(s) is (are) intended to be only illustrative, rather than exhaustive, of the present invention. Those of ordinary skill will be able to make certain additions, deletions, and/or modification to the embodiment(s) of the disclosed subject matter without departing from the spirit of the invention or its scope, as defined by the appended claims.

What is claimed is:

1. A protective relay for providing protective control to a power system carrying three-phase power, the protective relay comprising:
    a processor;
    at least one computer readable medium;
    program instructions stored on the at least one computer readable medium and executable by the processor to perform a fault detection method comprising:
        receiving a first set of signal values representative of the voltage properties of each phase of the three-phase power system and a second set of signal values representative of the current properties of each phase of the three-phase power system;
        processing said first set of signal values to produce a first set of processed signals representing the current change for each respective phase of the three phase power;
        processing said second set of signal values to produce a second set of processed signals representing the voltage change for each respective phase of the three phase power;
        determining a maximum value of said first set of processed signals and a maximum value of said second set of processed signals;
        dividing said maximum value of said first set of processed signals by a first threshold value resulting in a first quality value;
        dividing said maximum value of said second set of processed signals by a second threshold value resulting in a second quality value;
        selecting the set of processed signals having the larger quality value; and
        using said selected set of processed signals to determine whether a fault condition exists on any phase of the three phase power.

2. The protective relay of claim 1 further comprising the step of tripping a breaker associated with any phase determined to be in a fault condition.

3. The protective relay of claim 1 further comprising the step alerting an operator if a fault condition exists on any phase of the three phase power.

4. The protective relay of claim 1 wherein said step of using said selected set of processed signals to determine whether a fault condition exists includes:
    comparing the largest said maximum value to said threshold value associated therewith; and
    enabling the use of said selected set of processed signals if said largest maximum value exceeds said threshold value.

5. The protective relay of claim 4 wherein each said threshold value is manually adjustable.

6. The protective relay of claim 4 wherein said step of using said selected set of processed signals to determine whether a fault condition exists further includes:
    dividing each value of said set of selected processed signals by said maximum value;
    indicating a fault condition for every phase wherein the divided value is greater than a pre-selected value.

7. The protective relay of claim 4 further comprising the step of:
    displaying said first quality value and said second quality value.

8. A method of identifying faulted phases in a three phase power system comprising:
    receiving a first set of signal values representative of the voltage properties of each phase of the three-phase power system and a second set of signal values representative of the current properties of each phase of the three-phase power system;
    processing said first set of signal values to produce a first set of processed signals representing the current change for each respective phase of the three phase power;
    processing said second set of signal values to produce a second set of processed signals representing the voltage change for each respective phase of the three phase power;
    determining a maximum value of said first set of processed signals and a maximum value of said second set of processed signals;
    selecting the set of processed signals having the larger maximum value; and
    using said selected set of processed signals to determine whether a fault condition exists on any phase of the three phase power.

9. The method of claim 8 further comprising the step of tripping a breaker associated with any phase determined to be in a fault condition.

10. The method of claim 8 further comprising the step of indicating to an operator the faulted phase or phases of the three phase power.

11. The method of claim 8 wherein said step of using said selected set of processed signals to determine whether a fault condition exists includes:
    preselecting a threshold value value;
    comparing the largest said maximum value to said threshold value; and
    enabling the use of said selected set of processed signals if said largest maximum value exceeds said threshold value.

12. The method of claim 9 wherein said threshold value is manually adjustable.

13. The method of claim 11 wherein said step of using said selected set of processed signals to determine whether a fault condition exists further includes:
dividing each value of said set of selected processed signals by said maximum value;
indicating a fault condition for every phase wherein the divided value is greater than a second pre-selected threshold.

14. The method of claim 11 further comprising the step of:
dividing each said maximum value by said threshold value resulting in a voltage based quality and a current based quality;
displaying said voltage based quality and said current based quality.

* * * * *